Nov. 18, 1941.        R. A. GOEPFRICH        2,262,842
BRAKE
Filed March 3, 1938        2 Sheets-Sheet 1

INVENTOR.
RUDOLPH A. GOEPFRICH
BY
Jerome R. Cox
ATTORNEY.

Nov. 18, 1941.           R. A. GOEPFRICH           2,262,842
                              BRAKE
             Filed March 3, 1938           2 Sheets-Sheet 2

INVENTOR
RUDOLPH A. GOEPFRICH
BY Jerome R. Cox
ATTORNEY

Patented Nov. 18, 1941

2,262,842

UNITED STATES PATENT OFFICE 2,262,842

BRAKE

Rudolph A. Goepfrich, South Bend, Ind., assignor to Bendix Products Corporation, South Bend, Ind., a corporation of Indiana Application March 3, 1938, Serial No. 193,740

7 Claims. (Cl. 192—3)

This invention relates to braking systems, and more particularly to braking systems for motor vehicles.

An object of the invention is to provide means for retaining the brakes of a motor vehicle in applied position after a braking operation when the vehicle is ascending an incline.

Another object of the invention is to provide automatically operable means for retaining the brakes of a motor vehicle in applied position upon the conclusion of a braking operation when the vehicle is ascending an incline.

Another object of the invention is to provide a fluid pressure braking system for a motor vehicle having conventional controls with means for automatically retaining the brakes of the vehicle in applied position at the conclusion of a braking operation while the vehicle is ascending an incline, and to couple the retaining means with the controls of the vehicle so that movement of the controls automatically releases the retaining means.

Other objects of the invention will appear from the following description taken in connection with the drawings forming a part of this specification, and in which—

Figure 1:
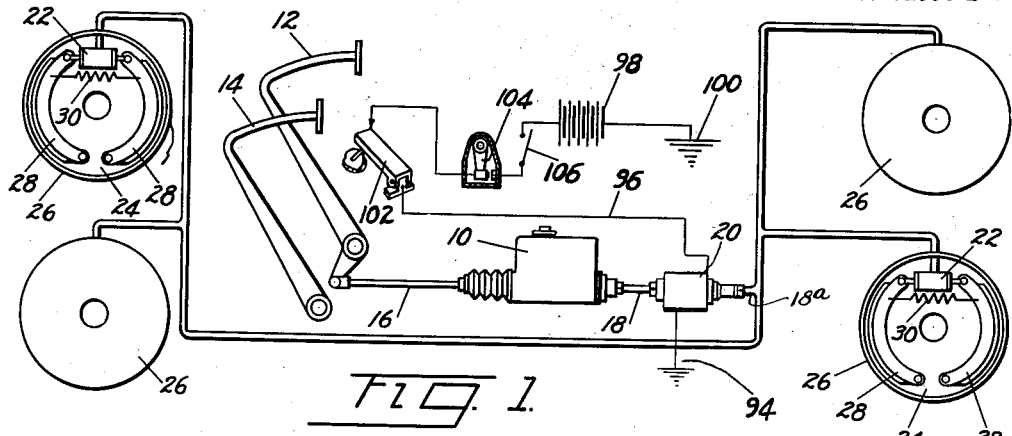
Fig. 1 is a schematic view of a fluid pressure braking system embodying the invention.

Referring to the drawings for more specific details of the invention, 10 represents a fluid pressure producing device of conventional type adapted to be actuated by a foot pedal lever 12 associated with a pedal lever 14 for control of a conventional clutch, not shown, and connected as by a thrust rod 16 to the device.

A fluid pressure delivery pipe or conduit at one end 18 connected to the fluid pressure producing device 10 is connected at its other end to one side of a valve 20 controlled by a solenoid, and a conduit 18a, connected to the valve 20 at the other side thereof, has branches connected respectively to fluid pressure actuated motors 22, preferably arranged in pairs, one pair for actuating the brakes associated with the front wheels of a vehicle and another pair for actuating the brakes associated with the rear wheels of the vehicle.

The brakes may be of any conventional type. As shown, each of the brakes includes a fixed support or backing plate 24, a rotatable drum 26 associated therewith, a pair of corresponding friction elements or shoes 28 pivoted on the backing plate for cooperation with the drum, a retractile spring 30 connecting the shoe, and a motor corresponding to the motors 22 mounted on the backing plate and connected to the shoes and operative to actuate the shoes into engagement with the drum against the resistance of the retractile spring.

Figure 5:
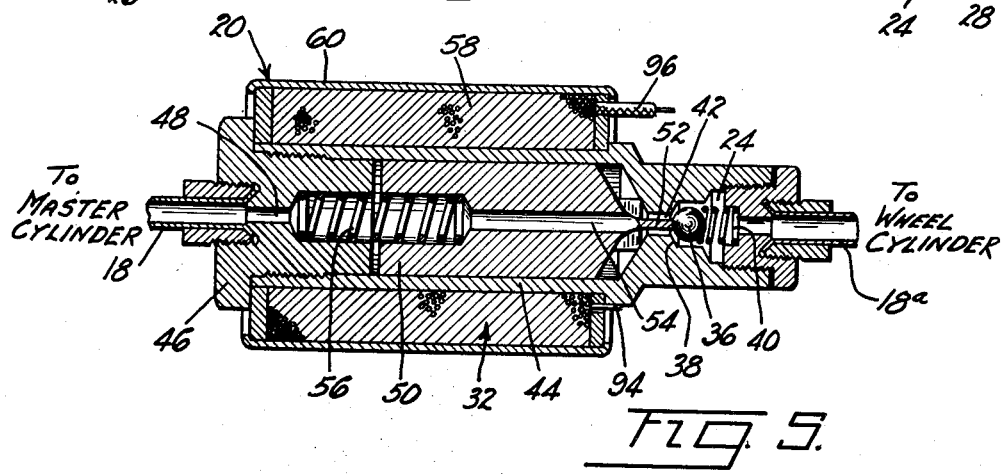
Fig. 5 is a longitudinal, sectional view of the solenoid valve.

The valve 20 is controlled as by a solenoid 32. As shown in Fig. 5, the valve includes a valve chamber 34 having therein a ball valve 36 urged to a seat 38 by a spring 40 so as to effectively close a passage 42 through the valve. A sleeve 44 integral with the valve chamber has in its open end a plug 46 provided with a bore 48 connected to the fluid pressure delivery pipe 18, and a plunger 50 reciprocable in the sleeve between the valve chamber and the plug 46 has a projection 52 extending into the passage 42 and engaging the ball valve 36.

The plunger has a passage 54 extending therethrough, and a spring 56 is interposed between the plunger and the plug. The load on the spring 56 is greater than the load on the spring 40, and, accordingly, the valve 36 is normally held open, and a coil 58 wound on the sleeve 44 is enclosed by a suitable casing 60.

Figure 6:
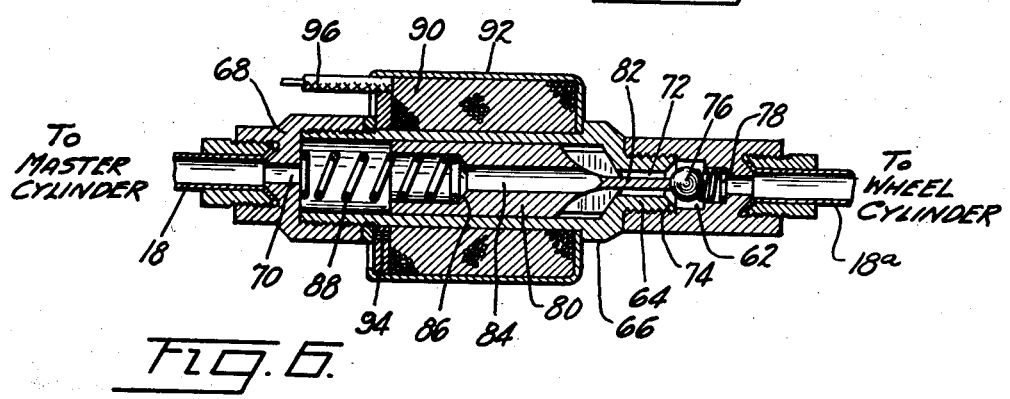
Fig. 6 is a similar view illustrating a modification of the solenoid valve.

A modification of the valve is illustrated in Fig. 6. In this modification a valve chamber 62 connected to the fluid pressure delivery pipe 18 has threaded therein a nipple 64 supporting a sleeve 66, and threaded on the sleeve is a cap 68 having a port 70 connected to the fluid pressure pipe 18. The passage 72 of the nipple terminates at the inner end of the nipple in a valve seat 74, and a ball valve 76 in the valve chamber 62 is urged to the seat by a spring 78.

A plunger 80 reciprocable in the sleeve has an extension 82 projecting into the passage and engaging the ball valve 76. The plunger also has a passage 84 extending therethrough. A portion of this passage is enlarged to provide a shoulder 86, and a spring 88 supported in this enlarged portion of the passage has one of its ends seated on the shoulder 86 and its other end seated on the cap 68. The load on this spring 88 is greater than the load on the spring 78, and, accordingly, the ball valve is normally retained open so that fluid may freely flow through the valve, and a coil 90 wound on the sleeve 66 is enclosed by a suitable casing 92.

One terminal of the coil of the solenoid is grounded as indicated at 94, and the other terminal of the coil is connected by a circuit 96 to a battery 98 grounded as indicated at 100. The circuit 96 has connected therein an acceleration pedal 102 constituting a make-and-break for the circuit, a gravity switch 104, and a manually operated switch 106 for breaking the circuit when desired.

In this embodiment of the invention, when the vehicle is ascending an incline, should it be desired to stop the vehicle, the operator releases the accelerator pedal 102 and actuates the clutch pedal lever 14 to disengage the clutch, and substantially simultaneously therewith actuates the foot pedal lever 12 to apply the brakes, as in general practice. Assuming that the switch 106 is closed and that the incline which the vehicle is ascending is sufficiently steep to cause the gravity switch 104 to close, the return of the accelerator pedal to retracted position closes the circuit, whereupon the solenoid is energized, resulting in closing the valve 20.

Under this condition, the fluid in the system between the valve 20 and the fluid pressure motors 22 associated with the brakes is trapped, and, consequently, the brakes are held in applied position.

Now, when it is desired to go forward or backward, the transmission of the vehicle is shifted to the required position, and the clutch is released, and substantially simultaneously with release of the clutch the accelerator pedal is depressed, and this movement of the accelerator pedal breaks the circuit, resulting in de-energization of the solenoid and the consequent opening of the valve 20, followed by instant release of the brakes.

Figure 2:
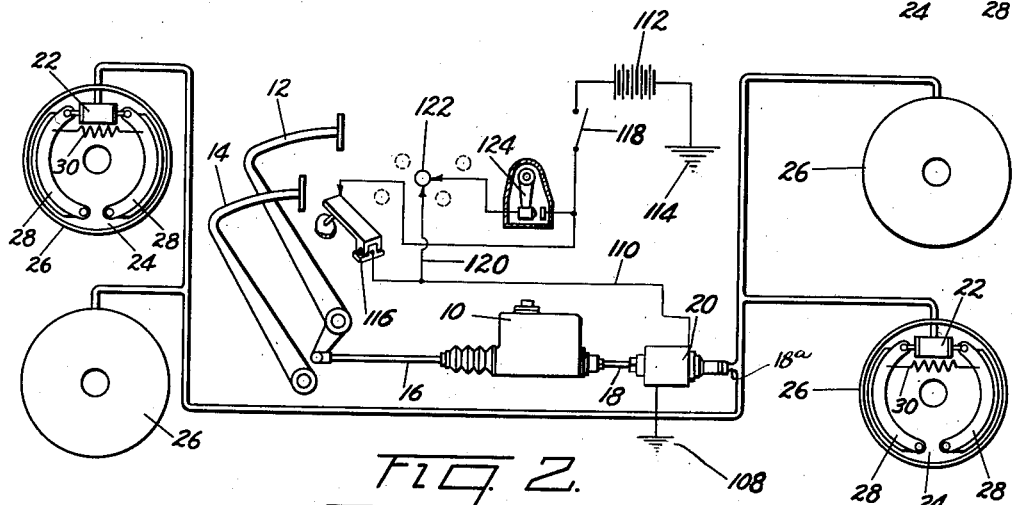
Fig. 2 is a schematic view of a braking system illustrating a modification of the invention.

A modification of the invention is illustrated in Fig. 2. In this modification one terminal of the solenoid is grounded as indicated at 108, and the other terminal of the solenoid is connected by a circuit 110 to a battery 112 grounded as indicated at 114. The circuit 110 has connected therein an accelerating pedal 116 constituting a make-and-break for the circuit, and a manually operated switch 118 for breaking the circuit when desired. A circuit 120 bridging the accelerating pedal lever 116 has connected therein a transmission part, indicated generally at 122, operative to close the circuit only when in neutral, and a gravity switch 124 operative to close the circuit when the vehicle is ascending an incline.

In a normal operation of this embodiment of the invention, when the vehicle is ascending an incline and it is desired to stop the vehicle, the operator releases the accelerator pedal 116 and actuates the foot pedal lever 14 to disengage the clutch, and substantially simultaneously therewith depresses the foot pedal lever 12 to apply the brakes, as in general practice, and thereafter shifts the transmission 122 to neutral position. Under this condition, the circuit 110 is closed, and, likewise, the circuit 120 bridging the accelerating pedal 116 is closed. Accordingly the solenoid is energized, resulting in closing the valve 20 and trapping of fluid in the system to retain the brakes in applied position.

Now when it is desired to again place the vehicle in motion, the transmission is shifted to the first speed forward position, or in the reverse position, according to the desire of the operator. This actuation of the transmission breaks the circuit 120 bridging the accelerator pedal 116. The operator then releases the clutch, and simultaneously therewith depresses the accelerator pedal 116, and this movement of the accelerator pedal lever breaks the circuit 110, resulting in de-energization of the solenoid accompanied by opening of the valve, resulting in release of the brakes.

Figure 3:
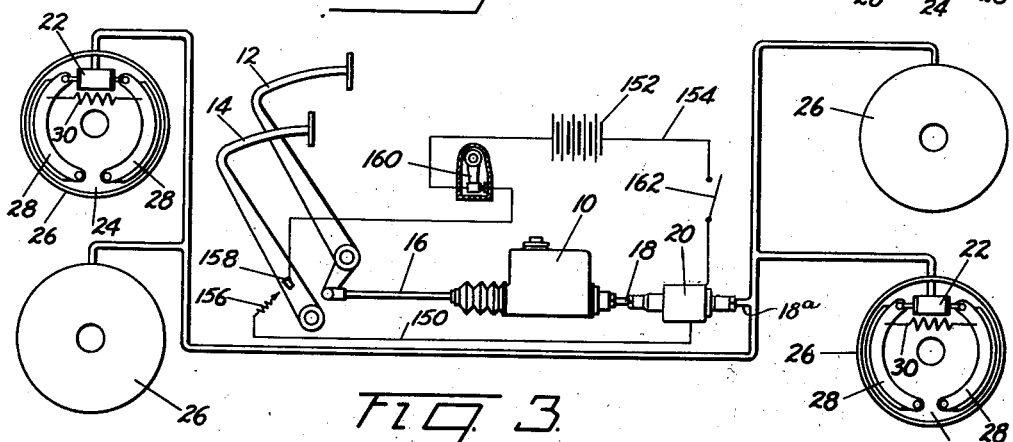
Fig. 3 is a schematic view of a braking system illustrating another modification of the invention.

Another embodiment of the invention is illustrated in Fig. 3. In this embodiment of the invention one terminal of the solenoid is connected by a circuit 150 to one pole of a battery 152, the other pole of which is connected by a circuit 154 to the other terminal of the solenoid. The circuit 150 has connected therein a contact 156 arranged for engagement by a contactor 158 carried by the clutch pedal 14, and a gravity switch 160 adapted to close when the vehicle is ascending an incline, and connected in the circuit 154 is a manually operative switch 162 for breaking the circuit when desired.

In a normal operation of this embodiment of the invention, when the vehicle is ascending an incline, the gravity switch is normally closed. Under this condition, should it be desired to stop the vehicle, the operator actuates the clutch pedal lever 14 to release the clutch, and depresses the foot pedal lever 12 to apply the brakes, as in general practice. This movement of the clutch pedal lever 14 engages the contactor 158 with the contact 156, and thereby closes the circuit 150, whereupon the solenoid is energized and operates to release the valve 20, whereupon the valve moves to its closed position and traps the fluid in the system so as to retain the brakes in applied position.

Now, when desirous of putting the vehicle in motion, the operator releases the foot pedal lever 14 so as to engage the clutch, and this movement of the foot pedal lever 14 disengages the contactor 158 from the contact 156, resulting in breaking the circuit and de-energization of the solenoid, resulting in opening the valve 20 and thereby releasing the brakes.

Figure 4:
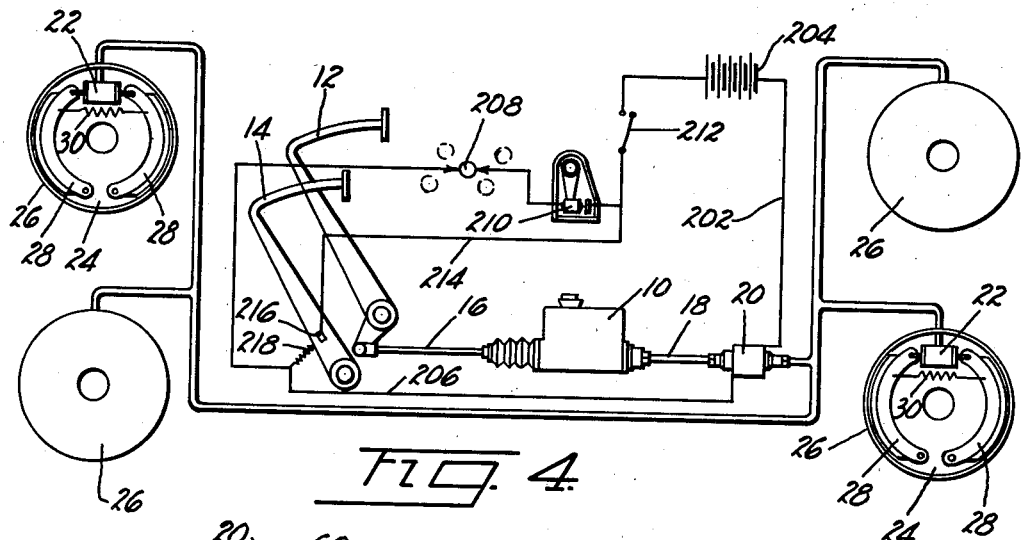
Fig. 4 is a schematic view of a braking system illustrating yet another modification of the invention.

Yet another modification of the invention is illustrated in Fig. 4. In this modification one terminal of the solenoid is connected by a circuit 202 to one pole of a battery 204, and the other terminal of the solenoid is connected by a circuit 206 to the other pole of the battery. The circuit 206 has connected therein a transmission indicated generally at 208 adapted to close the circuit only when in neutral, a gravity switch 210 adapted to close the circuit only when the vehicle is ascending an incline, and a manually operative switch 212 for breaking the circuit when desired.

A circuit 214 bridging the transmission 208 and the gravity switch 210 has connected therein a contactor 218 cooperating with the contactor 216.

In a normal operation of this embodiment of the invention, the circuit 206 is closed only when the transmission 208 is in neutral position, and the gravity switch 210 is closed as when the machine is ascending an incline. However, the transmission 208 and the gravity switch 210 are bridged by the circuit 214, and this circuit is closed by the contactor 216 carried on the clutch pedal lever 14 engaging the contact 218. Accordingly, when stopping the vehicle on an incline, the circuit 206 may be closed by shifting the transmission to neutral position, or the operator may depress the foot pedal lever 14 to release the clutch, in which event the circuit 214 bridging the transmission 208 and gravity switch 210 is closed by the contactor 216 carried by the clutch pedal lever 14 engaging the contact 218. In either instance, assuming that the brakes have been applied, the solenoid is energized and operates to release the valve 20, whereupon the valve moves to closed position and traps the fluid in the system so as to retain the brakes in applied position.

When it is desired to put the vehicle in motion, the operator shifts the transmission to either first speed forward or reverse position, and this movement of the transmission breaks the circuit 206. The foot lever 14 is then released so as to engage the clutch, and this results in breaking the circuit 214. The opening of the circuits 206 and 214 results in de-energization of the solenoid, and operation thereof to release the valve, whereupon the valve moves to open position, resulting in release of the brakes.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. In combination with a fluid pressure braking system for a motor vehicle having conventional controls, means for trapping fluid in the system for retaining the brakes of the vehicle in applied position, electrical means for control of the trapping means, a gravity switch for control of the electrical means, and a second control for the electrical means actuated by movement of at least one of the vehicle controls, and parallel to the gravity switch.

2. In combination with a fluid pressure braking system for a motor vehicle having conventional controls, means for trapping fluid in the system for retaining the brakes of the vehicle in applied position, electrical means for control of the trapping means, gravity actuated means for control of the electrical means, means for control of the electrical means actuated by movement of one of the vehicle controls, and means for control of the electrical means actuated by movement of another of the vehicle controls and parallel to the last-named control means.

3. In combination with a fluid pressure braking system for a motor vehicle having conventional controls including an accelerator pedal, a valve for trapping fluid in the system for the retention of the brakes of the vehicle in applied position, a solenoid for control of the valve, means for energizing the solenoid including an electrical circuit, a gravity switch in the circuit, and means carried by the accelerator pedal for opening and closing the circuit.

4. In combination with a fluid pressure braking system for a motor vehicle having conventional controls including a transmission and an accelerator pedal, a valve for trapping fluid in the system for the retention of the brakes of the vehicle in applied position, a solenoid for control of the valve, an electrical circuit for the solenoid, means carried by the accelerator pedal for opening and closing the circuit, a circuit bridging the accelerator pedal, a gravity switch connected in the bridging circuit, and means carried by the transmission for opening and closing the bridging circuit.

5. In a fluid pressure braking system for a motor vehicle having conventional controls including a transmission and a clutch pedal, a valve connected in the system for trapping fluid in the system so as to retain the brakes of the vehicle in applied position, a solenoid for control of the valve, an electrical circuit for the solenoid, a gravity switch connected in the circuit, a switch in the circuit controlled by movement of the transmission, a circuit bridging the transmission and gravity switch, and means carried by the clutch pedal for opening and closing the bridging circuit.

6. In a fluid pressure braking system including a fluid pressure producing device and fluid pressure actuated motors connected thereto, a valve chamber having a sleeve communicating therewith, said valve and sleeve connected in the system between the pressure producing device and the motors, a spring-pressed valve in the chamber for closing the communication, a spring-pressed plunger in the sleeve having a passage therethrough, an extension on the plunger engaging the valve and normally retaining the valve open, and a coil wound on the sleeve adapted to be connected to a source of electrical energy.

7. In combination with a fluid pressure braking system for a motor vehicle having controls including a transmission part, a valve for trapping fluid in the system for the retention of the brakes of the vehicle in an applied position, a solenoid for control of the valve, an electrical circuit for the solenoid, a gravity switch connected in the circuit, and means actuated by movement of the transmission part for opening and closing the circuit.

RUDOLPH A. GOEPFRICH.

CERTIFICATE OF CORRECTION.

Patent No. 2,262,842.  November 18, 1941.

RUDOLPH A. GOEPFRICH.

It is hereby certified that error appears in the printed specification of the above numbered patent requiring correction as follows: Page 1, first column, lines 48 and 49, strike out "at one end" and insert the same after "connected" in said line 49, and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.